(12) United States Patent
Yasunaga

(10) Patent No.: US 10,105,994 B2
(45) Date of Patent: Oct. 23, 2018

(54) PNEUMATIC TIRE

(71) Applicant: TOYO TIRE & RUBBER CO., LTD., Osaka-shi, Osaka (JP)

(72) Inventor: Toshikazu Yasunaga, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 362 days.

(21) Appl. No.: 14/285,090

(22) Filed: May 22, 2014

(65) Prior Publication Data
US 2015/0020940 A1  Jan. 22, 2015

(30) Foreign Application Priority Data

Jul. 16, 2013 (JP) .................................. 2013-147298

(51) Int. Cl.
*B60C 11/13* (2006.01)
*B60C 11/03* (2006.01)

(52) U.S. Cl.
CPC ...... *B60C 11/1323* (2013.01); *B60C 11/0302* (2013.01); *B60C 11/0306* (2013.01); *B60C 2011/0374* (2013.01); *B60C 2011/133* (2013.01)

(58) Field of Classification Search
CPC ........... B60C 11/1323; B60C 2011/133; B60C 11/0302
See application file for complete search history.

(56) References Cited

U.S. PATENT DOCUMENTS

| 4,832,099 | A | | 5/1989 | Matsumoto | |
|---|---|---|---|---|---|
| 5,044,414 | A | * | 9/1991 | Ushikubo | ........... B60C 11/0302 152/209.24 |
| 5,188,684 | A | * | 2/1993 | Himuro | ............... B60C 11/0306 152/209.15 |
| 2001/0032691 | A1 | * | 10/2001 | Ohsawa | ................. B60C 11/13 152/209.18 |

FOREIGN PATENT DOCUMENTS

| DE | 3720908 A1 | | 9/1988 |
|---|---|---|---|
| DE | 10311430 | * | 9/2004 |

(Continued)

OTHER PUBLICATIONS

English machine translation of DE10311430, dated Sep. 2004.*

(Continued)

*Primary Examiner* — Robert C Dye
(74) *Attorney, Agent, or Firm* — Westerman, Hattori, Daniels & Adrian, LLP

(57) ABSTRACT

A pneumatic tire includes a tread surface which is sectioned into a center area, a mediate area arranged in an outer side of the center area, and a shoulder area arranged in an outer side of the mediate area, wherein inclined grooves are formed spaced apart in a tire circumferential direction, the inclined grooves continuously extending from the mediate area to the shoulder area, in blocks in the mediate area and the shoulder area sectioned by the inclined grooves, an angle of inclination of a side wall on a leading side with respect to a normal direction of the tread surface is greater than an angle of inclination of a side wall on a trailing side with respect to a normal direction of the tread surface, and a plurality of dimples are formed in the side wall on the leading side of the block in the mediate area.

4 Claims, 3 Drawing Sheets

(56) References Cited

FOREIGN PATENT DOCUMENTS

| EP | 1048488 | * 11/2000 |
|----|---------|-----------|
| JP | 3-032906 A | 2/1991 |
| JP | 4-208606 A | 7/1992 |
| JP | 9-300916 A | 11/1997 |
| JP | 11-180115 A | 7/1999 |

OTHER PUBLICATIONS

English machine translation of JP11-180115, dated Jul. 1999.*
English machine translation of JP09-300916 (Year: 1997).*
Office Action dated Nov. 9, 2016, issued German Patent Application No. 102014109864.1, with English translation. (15 pages).
Office Action dated Jan. 5, 2017, issued in Japanese Patent Application No. 2013-147298 with English translation. (8 pages).

* cited by examiner

PNEUMATIC TIRE

BACKGROUND OF THE INVENTION

Field of the Invention

The present invention relates to a pneumatic tire having a tread surface which is sectioned, by a plurality of circumferential grooves extending in a tire circumferential direction, into a center area including a tire equator, a mediate area arranged in an outer side in a tire width direction of the center area, and a shoulder area arranged in an outer side in the tire width direction of the mediate area.

Description of the Related Art

Generally, the tread surface of the pneumatic tire is sectioned into a plurality of blocks by a groove portion such as circumferential grooves extending in a tire circumferential direction and lateral grooves extending so as to intersect the circumferential grooves, and is provided with various tread patterns in accordance with required tire performance and use condition.

The following Patent Document 1 describes a pneumatic tire provided with a tread pattern in which blocks are formed by a number of directional inclined grooves extending in a V-shaped form to the right and left while holding a pattern center therebetween and arranged spaced apart in a tire circumferential direction, and connection grooves connecting the adjacent directional inclined grooves. In this pneumatic tire, in order to solve a problem that wear from a leading side of the block tends to make progress particularly in a shoulder portion by a side force generated during cornering, an excavation is provided in a side wall on the leading side of the block. By providing the excavation in the side wall on the leading side of the block, block rigidity on the leading side becomes smaller, and early wear can be suppressed. However, since the wear on the leading side of the block is suppressed in the pneumatic tire of Patent Document 1, heel-and-toe wear in which the trailing side wears by priority tends to be increased.

The following Patent Document 2 describes a pneumatic tire in which a plurality of circumferential grooves extending along a tire circumferential direction and a plurality of inclined grooves extending from the center in a tire width direction toward an outer side in the tire width diction. In the pneumatic tire, a concave portion is formed in a side wall on the leading side of the second block counting from a shoulder side to a tire equator surface side. As a result, compression rigidity on the leading side of the block is reduced, and it is possible to prevent a pattern noise from being deteriorated in the case where heel-and-toe wear is generated. However, in the pneumatic tire of Patent Document 2, the heel-and-toe wear itself is deteriorated in the same manner as Patent Document 1. Furthermore, since the concave portion is formed along the inclined groove in the entire side wall of the second block, a cross-sectional shape of the inclined groove becomes discontinuous between the second block and the shoulder block, and drainage performance is deteriorated.

PRIOR ART DOCUMENTS

Patent Documents

Patent Document 1: JP-A-09-300916
Patent Document 2: JP-A-11-180115

SUMMARY OF THE INVENTION

The present invention has been made in view of the above circumstances, and an object thereof is to provide a pneumatic tire which can reduce heel-and-toe wear while suppressing deterioration of drainage performance.

In order to achieve the above object, a pneumatic tire according to the present invention includes a tread surface which is sectioned, by a plurality of circumferential grooves extending in a tire circumferential direction, into a center area including a tire equator, a mediate area arranged in an outer side in a tire width direction of the center area, and a shoulder area arranged in an outer side in the tire width direction of the mediate area, wherein a plurality of inclined grooves are formed spaced apart in a tire circumferential direction, the inclined grooves continuously extending from the mediate area to the shoulder area while being inclined to an outer side in the tire width direction toward a rear side in a tire rotating direction, in blocks in the mediate area and the shoulder area sectioned by the inclined grooves, an angle of inclination of a side wall on a leading side with respect to a normal direction of the tread surface is greater than an angle of inclination of a side wall on a trailing side with respect to a normal direction of the tread surface, and a plurality of dimples are formed in the side wall on the leading side of the block in the mediate area.

A description will be given of an operation and effect of the pneumatic tire according to the structure described above. The pneumatic tire according to the present invention has the tread surface which is sectioned into the center area, the mediate area, and the shoulder area by a plurality of circumferential grooves extending in the tire circumferential direction, and a plurality of inclined grooves are formed spaced apart in the tire circumferential direction, the inclined grooves continuously extending from the mediate area to the shoulder area while being inclined to the outer side in the tire width direction toward the rear side in the tire rotating direction. Since the inclined grooves are formed in the tread surface, drainage performance is satisfactory. Further, in the blocks in the mediate area and the shoulder area sectioned by the inclined grooves, the angle of inclination of the side wall on the leading side with respect to the normal direction of the tread surface is greater than the angle of inclination of the side wall on the trailing side with respect to the normal direction of the tread surface. Accordingly, rigidity on the leading side is enhanced, and an amount of wear on the leading side is increased. As a result, since the amount of wear on the leading side comes close to the amount of wear on the trailing side, it is possible to reduce heel-and-toe wear.

Meanwhile, it is known that the heel-and-toe wear tends to be generated particularly in the block in the shoulder area. Therefore, in the case where the inclined grooves are continuously formed from the mediate area to the shoulder area as described above, the heel-and-toe wear can be reduced in the block in the shoulder area. However, there is a risk that the amount of wear on the leading side is excessively increased in the block in the mediate area and exceeds the amount of wear on the trailing side. Accordingly, in the present invention, a plurality of dimples are formed in the side wall on the leading side of the block in the mediate area, thereby reducing the rigidity on the leading side. At this time, it can be considered to reduce the rigidity on the leading side by making the angle of inclination of the side wall on the leading side in the block of the mediate area smaller than the block in the shoulder area. However, this structure is not preferable since the cross-sectional shape of the inclined groove is changed between the mediate area and the shoulder area and the drainage performance is deteriorated.

In the pneumatic tire according to the present invention, it is preferable that the dimple is not open to the circumferential groove between the mediate area and the shoulder area.

With this structure, since the cross-sectional shape of the inclined groove is hardly changed between the mediate area and the shoulder area, it is possible to suppress the deterioration of the drainage performance.

In the pneumatic tire according to the present invention, it is preferable that a volumetric capacity of the dimples on the shoulder area side is greater than a volumetric capacity of the dimples on the center area side.

With this structure, since it is possible to reduce rigidity of an edge on the leading side and the shoulder area side of the block in the mediate area, it is possible to reduce the wear in the edge which is generated during hard cornering.

DETAILED DESCRIPTION OF THE PREFERRED EMBODIMENTS

Figure 1:
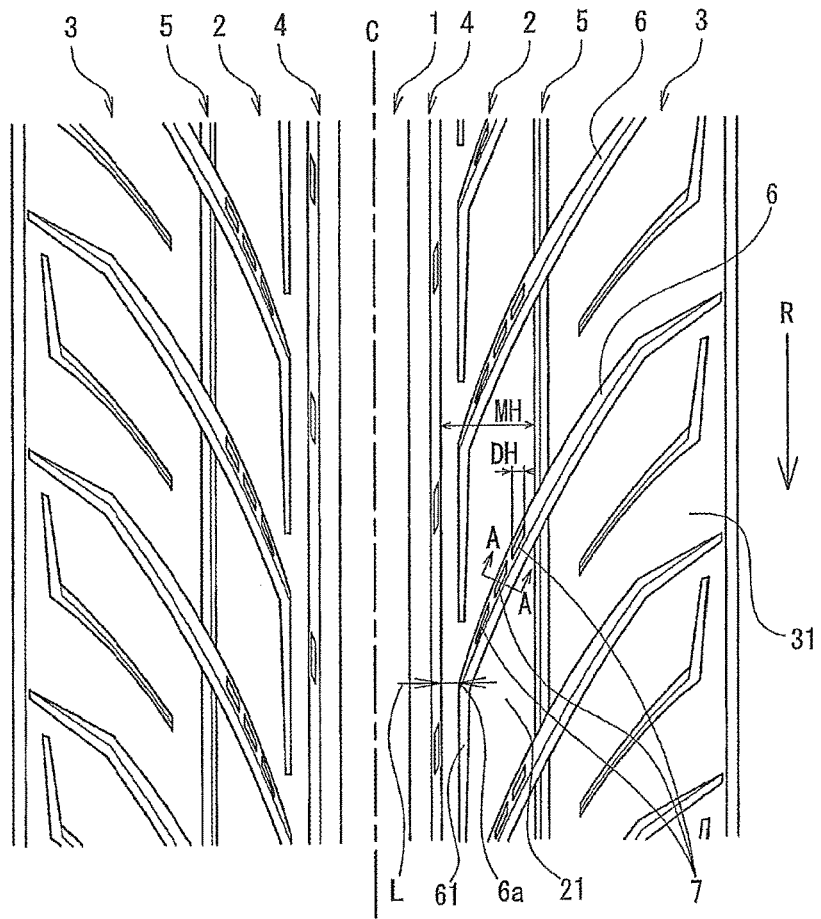
FIG. 1 is a plan view showing an example of a tread surface of a pneumatic tire according to the present invention.

A description will be given below of embodiments according to the present invention with reference to the drawings. FIG. 1 is a plan view showing an example of a tread surface of a pneumatic tire according to the present invention. The pneumatic tire according to the present embodiment has a tread surface which is sectioned, by a plurality of circumferential grooves extending in a tire circumferential direction, into a center area 1 including a tire equator C, a mediate area 2 arranged in an outer side in a tire width direction of the center area 1, and a shoulder area 3 arranged in an outer side in the tire width direction of the mediate area 2. An arrow R indicates a tire rotating direction.

In the present embodiment, four circumferential grooves are provided. The circumferential groove sectioning the center area 1 and the mediate area 2 is referred to as a main groove 4, and the circumferential groove sectioning the mediate area 2 and the shoulder area 3 is referred to as an auxiliary groove 5. Generally, the main groove 4 is provided with a plurality of tread wear indicators protruding out of a groove bottom thereof and spaced apart in the tire circumferential direction. Further, a groove depth of the auxiliary groove 5 is smaller than a groove depth of the main groove 4. For example, the groove depth of the auxiliary groove 5 is about between 50% and 95% of the groove depth of the main groove 4.

A plurality of inclined grooves 6 are formed spaced apart in the tire circumferential direction, the inclined grooves 6 continuously extending from the mediate area 2 to the shoulder area 3 while being inclined to an outer side in a tire width direction toward a rear side in a tire rotating direction R. By forming the inclined grooves 6 in the tread surface, drainage performance becomes satisfactory. An extending direction of the inclined groove 6 is preferably between 10° and 60°, and is more preferably between 20° and 40° with respect to the tire circumferential direction, in view of improving the drainage performance. In the present embodiment, the groove depth of the auxiliary groove 5 is smaller than a groove depth SD of the inclined groove 6. As a result, a groove wall lower portion exists in the inclined groove 6 even in a portion intersecting the auxiliary groove 5, and it is possible to inhibit deterioration of the drainage performance.

Land portions of the mediate area 2 and the shoulder area 3 are sectioned into a plurality of blocks by the inclined grooves 6. The inclined groove 6 according to the present embodiment is not open to the main groove 4. As a result, rigidity of the mediate area 2 can be maintained, and dry performance can be improved.

Since the inclined groove 6 is not open to the main groove 4 as described above, a plurality of blocks 21 in the mediate area 2 are not completely separated in the tire circumferential direction by the inclined groove 6. However, in the present invention, the blocks in which the adjacent blocks are partly connected in the tire circumferential direction as described above are also referred to as blocks. A distance L from an inside end 6a in the tire width direction of the inclined groove 6 to the main groove 4 is preferably between 3 mm and 20 mm, and is more preferably between 5 mm and 10 mm. If the distance L is shorter than 3 mm, the rigidity of the mediate area 2 is lowered. On the other hand, if the distance L is longer than 20 mm, sufficient drainage performance can not be achieved.

In the present embodiment, a longitudinal groove 61 is provided so as to extend along the tire circumferential direction from the inside end 6a in the tire width direction of the inclined groove 6. The longitudinal groove 61 contributes to the improvement of the drainage performance.

Figure 2:
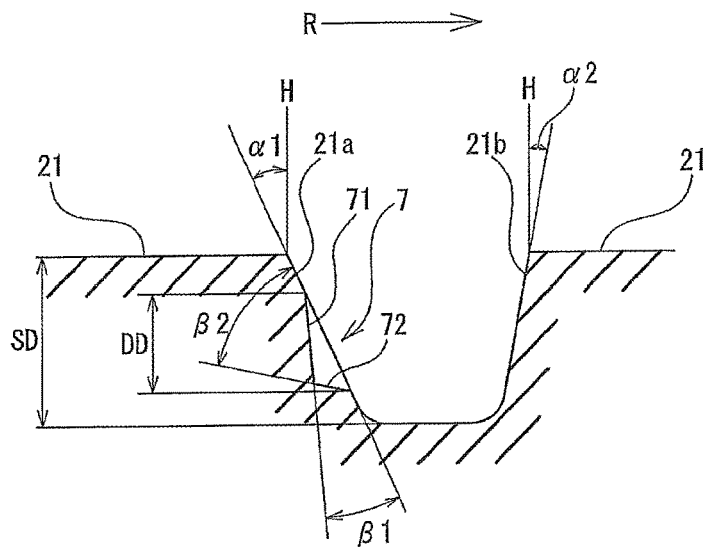
FIG. 2 is a cross-sectional view along a groove width direction of an inclined groove.

FIG. 2 is a cross-sectional view (cross-sectional view along line A-A in FIG. 1) along a groove width direction of the inclined groove. As shown in FIG. 2, an angle α1 of inclination of a side wall 21a on the leading side of the block 21 in the mediate area 2 with respect to a normal direction H of the tread surface is larger than an angle α2 of inclination of a side wall 21b on the trailing side with respect to the normal direction H of the tread surface. As a result, the rigidity on the leading side of the block 21 is enhanced, an amount of wear on the leading side is increased, and the amount of wear on the leading side comes close to the amount of wear on the trailing side. Thus, it is possible to reduce heel-and-toe wear. The reduction of the heel-and-toe wear also leads to improvement in noise performance.

The angle α1 of inclination of the side wall 21a on the leading side is between 20° and 60°. In view of the improvement of the rigidity of the side wall 21a on the leading side and the maintenance of the drainage performance, the angle α1 of inclination is more preferably between 30° and 60°, and particularly preferable between 40° and 60°. On the other hand, the angle α2 of inclination of the side wall 21b on the trailing side is smaller than 20°.

Since side walls on a leading side and a trailing side of a block 31 in the shoulder area 3 are the same as the blocks 21 in the mediate area 2, a detailed description thereof will be omitted.

Figure 3:
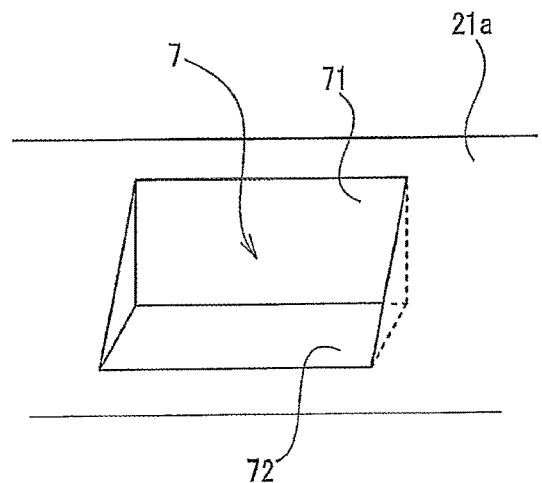
FIG. 3 is a perspective view of a side wall on a leading side of a block.

A plurality of dimples 7 are formed in the side wall 21a on the leading side of the block 21 in the mediate area 2. In the present embodiment, as shown in FIG. 1, for each inclined groove 6, three dimples 7 are formed along the inclined groove 6. FIG. 3 is a perspective view of the side wall 21a on the leading side of the block 21 in which the dimple 7 is formed. The dimple 7 is formed substantially in a triangular shape in its vertical cross section. The dimple 7 extends in a groove direction of the inclined groove 6.

The dimple 7 is configured by a dimple vertical surface 71 along a tire radial direction and a dimple transverse surface 72 along a tire circumferential direction. An angle β1 of the dimple vertical surface 71 with respect to the side wall 21a is preferably between 5° and 80°, and is more preferably between 30° and 60°. If the angle β1 is larger than 80°, there is a risk that the drainage performance is lowered, the rigidity on the leading side of the block 21 is excessively lowered, or a stone or sand is clogged in the dimple 7. Further, an angle β2 of the dimple transverse surface 72 with respect to the side wall 21a is preferably between 20° and 90°, and is more preferably between 30° and 60°. Similarly to the angle β1, if the angle β2 is larger than 90°, there is a risk that the drainage performance is lowered, the rigidity on the leading side of the block 21 is excessively lowered, or a stone or sand is clogged in the dimple 7.

The dimple 7 is formed substantially in the center portion in a groove depth direction of the side wall 21a. A length DD in the groove depth direction of an opening of the dimple 7 is preferably between 0.3 and 0.8 times of the groove depth SD of the inclined groove 6, and is more preferably between 0.5 and 0.7 times. If the length DD in the groove depth direction of the opening of the dimple 7 is smaller than 0.3 times of the groove depth SD of the inclined groove 6, the rigidity on the leading side of the block 21 becomes higher than the rigidity on the trailing side, and if the length DD is larger than 0.8 times, the drainage performance may be lowered, or the rigidity on the leading side of the block 21 may be excessively lowered.

A length DH in a tire width direction of the dimple 7 is preferably between 0.1 and 0.45 times of a length MH in the tire width direction of the mediate area 2, and is more preferably between 0.2 and 0.35 times. If the length DH in the tire width direction of the dimple 7 is smaller than 0.1 times of the length MH in the tire width direction of the mediate area 2, the rigidity on the leading side of the block 21 becomes higher than the rigidity on the trailing side, and if the length DH is larger than 0.45 times, the drainage performance may be lowered, and the rigidity on the leading side of the block 21 may be excessively lowered.

The pneumatic tire according to the present invention is the same as the general pneumatic tire except for the provision of the inclined grooves and the dimples as described above, and the conventionally known materials, shapes, and structures can be all employed in the present invention.

Other Embodiments (1) In the embodiment shown in FIG. 1, the inclined grooves 6 are arranged in each of both sides while holding the tire equator C therebetween, however, the inclined grooves 6 may be arranged only on one side. In this case, the number of the circumferential grooves on the side not provided with the inclined grooves 6, the tread pattern, and the like are not particularly limited.

(2) The shape of the dimple 7 formed in the side wall 21a on the leading side of the block 21 in the mediate area 2 is not limited to the shape shown in the embodiment described above.

Figure 4A:
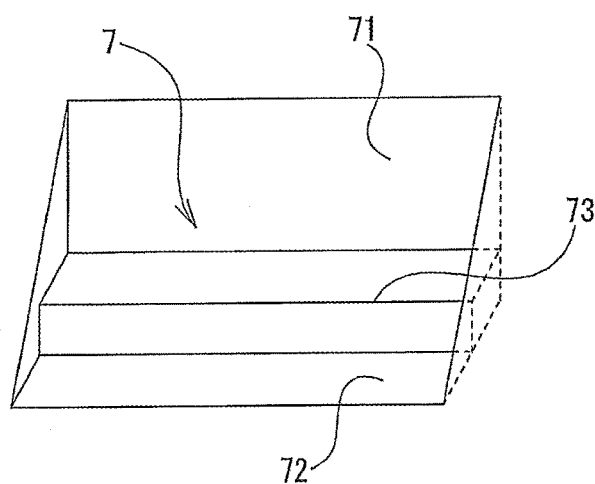
FIG. 4A is a perspective view of a side wall on a leading side of a block according to another embodiment.

For example, in an example in FIG. 4A, a protrusion body 73 is provided in a corner portion formed by the dimple vertical surface 71 and the dimple transverse surface 72. According to this structure, there is achieved an effect that a stone or sand is hardly clogged in the dimple 7.

Figure 4B:
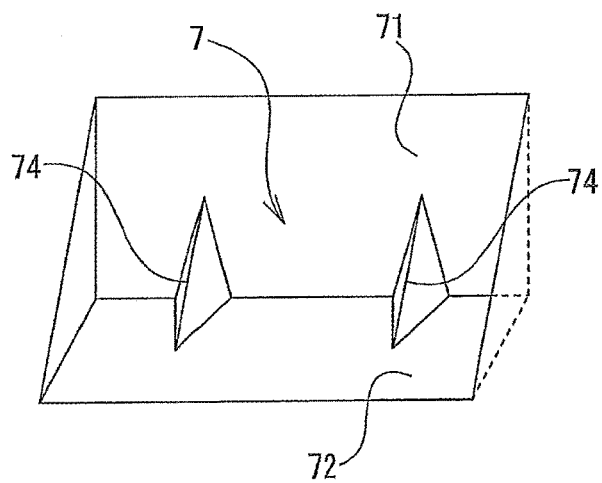
FIG. 4B is a perspective view of a side wall on a leading side of a block according to still another embodiment.

In an example in FIG. 4B, ribs 74 are formed in a corner portion formed by the dimple vertical surface 71 and the dimple transverse surface 72. According to this structure, there is achieved an effect that a stone or sand is hardly clogged in the dimple 7.

Figure 4C:
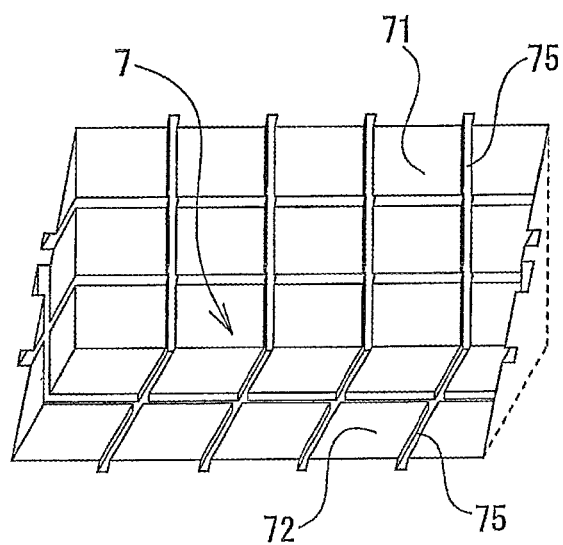
FIG. 4C is a perspective view of a side wall on a leading side of a block according to yet another embodiment.

In an example in FIG. 4C, grid-like grooves 75 are formed in the dimple vertical surface 71 and the dimple transverse surface 72. According to this structure, there is achieved an effect that the drainage performance within the dimple 7 is improved.

Examples

A description will be given below of examples which specifically show the structure and the effect of the present invention. Evaluation of each of performances of the tire was carried out as follows.

(1) Heel-and-Toe Wear

A heel-and-toe wear amount (a difference in an amount of wear between the leading side and the trailing side of the block) was measured after installing a tire having a size of 225/45R17 to an actual car (domestic 2000 cc class FR sports car), and traveling on a general road for 12000 km under a load condition of one passenger. The evaluation was made by an average value on an outside of the right and left tires which are installed to front wheels. Results were evaluated by an index on the basis that Comparative Example 1 is 100. The smaller value indicates the less heel-and-toe wear.

(2) Drainage Performance

Drainage performance was evaluated according to a feeling test, by installing a tire having a size of 225/45R17 to an actual car (domestic 2000 cc class FR sports car), and traveling straight, turning, and braking on a wet road surface under a load condition of one passenger. Results were evaluated by an index on the basis that Comparative Example 1 is 100. The larger value indicates the more excellent drainage performance.

(3) Amount of Wear of Edge Inside Auxiliary Groove

An amount of wear of an edge inside an auxiliary groove was measured after installing a tire having a size of 225/45R17 to an actual car (domestic 2000 cc class FR sports car), and sports traveling on a circuit course (1.5 km×five laps), under a load condition of one passenger. The evaluation was made by an average value on an outside of the right and left tires which are installed to front wheels. Results were evaluated by an index on the basis that Comparative Example 1 is 100. The smaller value indicates the less amount of wear.

Comparative Example and Examples

The angle α1 of inclination of the side wall on the leading side was set to 10° in Comparative Example 1, and the angle α1 of inclination of the side wall on the leading side was set to 30° in Examples 1 to 4. The angle α2 of inclination of the side wall on the trailing side of the block was set to 10° in Comparative Example 1 and Examples 1 to 4.

In Comparative Example 1, three dimples were provided in the side wall on the leading side of the block in the mediate area. Three dimples were all set to have the same volumetric capacity. In Example 1, dimples same as those in Comparative Example 1 were provided. In Example 2, the volumetric capacity of the dimple on the shoulder area side was made smaller than the volumetric capacity of the dimple on the center area side. The volumetric capacity ratio of the dimples was set to 100%, 100%, and 80% in this order from the center area side to the shoulder area side. In Example 3, the volumetric capacity of the dimple on the shoulder area side was made larger than the volumetric capacity of the dimple on the center area side. The volumetric capacity ratio of the dimples was set to 90%, 90%, and 100% in this order from the center area side to the shoulder area side. Example 4 was provided with two dimples in which the volumetric capacity of the dimple on the shoulder area side was made larger than the volumetric capacity of the dimple on the center area side. The volumetric capacity ratio of the dimples was set to 100% and 180% in this order from the center area side to the shoulder area side, and a total volumetric capacity of two dimples in Example 4 was set to be identical to a total volumetric capacity of three dimples of Example 3. Results of evaluation are shown in Table 1.

TABLE 1

|  | Comparative Example 1 | Example 1 | Example 2 | Example 3 | Example 4 |
|---|---|---|---|---|---|
| (1) Amount of Heel-and-Toe Wear (Mediate Area) | 100 | 98 | 98 | 98 | 99 |
| Amount of Heel-and-Toe Wear (Shoulder Area) | 100 | 95 | 95 | 95 | 95 |
| (2) Drainage Performance | 100 | 102 | 101 | 103 | 101 |
| (3) Amount of Wear of Edge Inside Auxiliary Groove | 100 | 99 | 100 | 98 | 100 |

As compared to Comparative Example 1, the heel-and-toe wear is reduced and the deterioration of the drainage performance is not found in Examples 1 to 4. Further, as compared to Example 2, the amount of wear of the edge inside the auxiliary groove was reduced in Example 3.

What is claimed is:

1. A pneumatic tire comprising:
   a tread surface which is sectioned, by a plurality of circumferential grooves extending in a tire circumferential direction, into a center area including a tire equator, a mediate area arranged in an outer side in a tire width direction of the center area, and a shoulder area arranged in an outer side in the tire width direction of the mediate area, wherein
   a main groove is formed sectioning the center area and the mediate area of the tread surface,
   a plurality of inclined grooves are formed spaced apart in the tire circumferential direction, the plurality of inclined grooves continuously extending from the mediate area to the shoulder area, forming blocks in the mediate area and the shoulder area, and inclined to an outer side in the tire width direction toward a rear side in a tire rotating direction, wherein the plurality of inclined grooves do not extend to the main groove,
   the blocks are formed such that an angle of inclination of a side wall on a leading side with respect to a normal direction of the tread surface is greater than an angle of inclination of a side wall on a trailing side with respect to a normal direction of the tread surface, and
   a plurality of dimples are formed in the side wall on the leading side of each of the blocks in the mediate area portion of the tread surface
   the plurality of dimples are formed along the plurality of inclined grooves,
   wherein the plurality of dimples are formed substantially triangular in shape in its vertical cross section,
   wherein for each of the blocks in the mediate area portion, only the sidewall of the leading side of each of the blocks in the mediate area portion is provided with dimples,
   wherein the plurality of dimples consists of dimples that do not open to the circumferential groove between the mediate area and the shoulder area, and
   wherein an auxiliary groove is formed sectioning the mediate area and the shoulder area of the tread surface, and a groove depth of the auxiliary groove is smaller than a groove depth of the main groove and a groove depth of the inclined grooves.

2. The pneumatic tire according to claim 1, wherein the plurality of dimples have volumetric capacities that respectively increase with decreasing distance thereof from the shoulder area.

3. A pneumatic tire comprising:
   a tread surface which is sectioned, by a plurality of circumferential grooves extending in a tire circumferential direction, into a center area including a tire equator, a mediate area arranged in an outer side in a tire width direction of the center area, and a shoulder area arranged in an outer side in the tire width direction of the mediate area, wherein
   a main groove is formed sectioning the center area and the mediate area of the tread surface,
   a plurality of inclined grooves are formed spaced apart in the tire circumferential direction, the inclined grooves continuously extending from the mediate area to the shoulder area, forming blocks in the mediate area and the shoulder area, and inclined to an outer side in the tire width direction toward a rear side in a tire rotating direction, wherein the plurality of inclined grooves do not extend to the main groove,
   the blocks are formed such that an angle of inclination of a side wall on a leading side with respect to a normal direction of the tread surface is greater than an angle of inclination of a side wall on a trailing side with respect to a normal direction of the tread surface, and
   a plurality of dimples are formed in the side wall on the leading side of each of the blocks in the mediate area portion of the tread surface
   the plurality of dimples are formed substantially in a center portion in a groove depth direction of the side wall on the leading side of each of the blocks,
   wherein the plurality of dimples are formed substantially triangular in shape in its vertical cross section,
   wherein for each of the blocks in the mediate area portion, only the sidewall of the leading side of each of the blocks in the mediate area portion is provided with dimples,
   wherein the plurality of dimples consists of dimples that do not open to the circumferential groove between the mediate area and the shoulder area, and
   wherein an auxiliary groove is formed sectioning the mediate area and the shoulder area of the tread surface, and a groove depth of the auxiliary groove is smaller than a groove depth of the main groove and a groove depth of the inclined grooves.

4. The pneumatic tire according to claim 3, wherein the plurality of dimples have volumetric capacities that respectively increase with decreasing distance thereof from the shoulder area.

* * * * *